March 13, 1934.  M. SMOLENSKY  1,950,575
CHECK VALVE
Filed May 3, 1930  3 Sheets-Sheet 1

Inventor
Michael Smolensky,
By
Justin W. Macklin, Attorney

March 13, 1934.  M. SMOLENSKY  1,950,575
CHECK VALVE
Filed May 3, 1930   3 Sheets-Sheet 2

Inventor
Michael Smolensky,
By Justin W Macklin,
Attorney

March 13, 1934.  M. SMOLENSKY  1,950,575
CHECK VALVE
Filed May 3, 1930  3 Sheets-Sheet 3

Inventor
Michael Smolensky
By Justin W. Macklin,
Attorney

Patented Mar. 13, 1934

1,950,575

UNITED STATES PATENT OFFICE 1,950,575

CHECK VALVE

Michael Smolensky, Cleveland, Ohio

Application May 3, 1930, Serial No. 449,427

12 Claims. (Cl. 277—42)

This invention relates to check valves and particularly to large check valves, and has for its principal object the reduction of resistance incidental to the flow of liquid through the valve.

Other objects include the construction of a check valve in such manner that when in position in the pipe line it presents a maximum opening through the valve, yet does not require a valve body of greatly increased outside diameter.

Another object is to provide a check valve having simple, efficient means for connecting and disconnecting the valve body to the pipe line.

More specific objects include the arrangement of the cooperating parts of a check valve in such manner that as the fluid passes through the valve it shall be given the most unrestricted flow consistent with economical construction, size of parts, etc. As a further means of facilitating flow, I may provide a novel arrangement of the valve disk or plug which is so shaped with relation to the inner surfaces of the valve body and to the direction of flow as to greatly reduce the friction and any losses within the valve.

Another object of my invention is to provide such a valve as for example, the check valve, with auxiliary opening and closing check valves carried on the valve disk or plug, which may be used without otherwise materially altering the shape or curvatures of the present check valve arrangements or construction, and yet which will reduce the outward or radial flow around the valve disk or plug and permit a sufficient portion of the stream to pass substantially straight through the valve to greatly reduce the eddying currents and effectively direct the inward flow at the low pressure side of the valve disk or plug.

In carrying out my invention I may provide an ideal arrangement by the novel and improved shaping of the valve disk or plug to present a crown surface toward the pressure side or flow of the stream, with other changes in the valve seat mounting and walls of the valve casing. In addition, I provide a suitable number of auxiliary check valves on the main disk or plug to permit a large part of the stream to pass substantially straight through in its normal direction, further reducing the amount of eddy and back wash, by the use of a crowned valve seat.

The value of my arrangement is that it may be economically manufactured, yet is very durable in use. Worn parts may be readily replaced or repaired, the entire valve and its parts being easily accessible. As a result of reducing friction or pressure loss in such valves, the economies attained in pumping operations effect a saving many times the cost of the valve in the course of the life of such installations.

Other objects and advantages will become apparent from the following description which refers to the drawings, the essential characteristics being summarized in the claims.

In the drawings—

Figs. 2 to 5 are shown on a scale substantially one-half that of Fig. 1.

Figure 1:
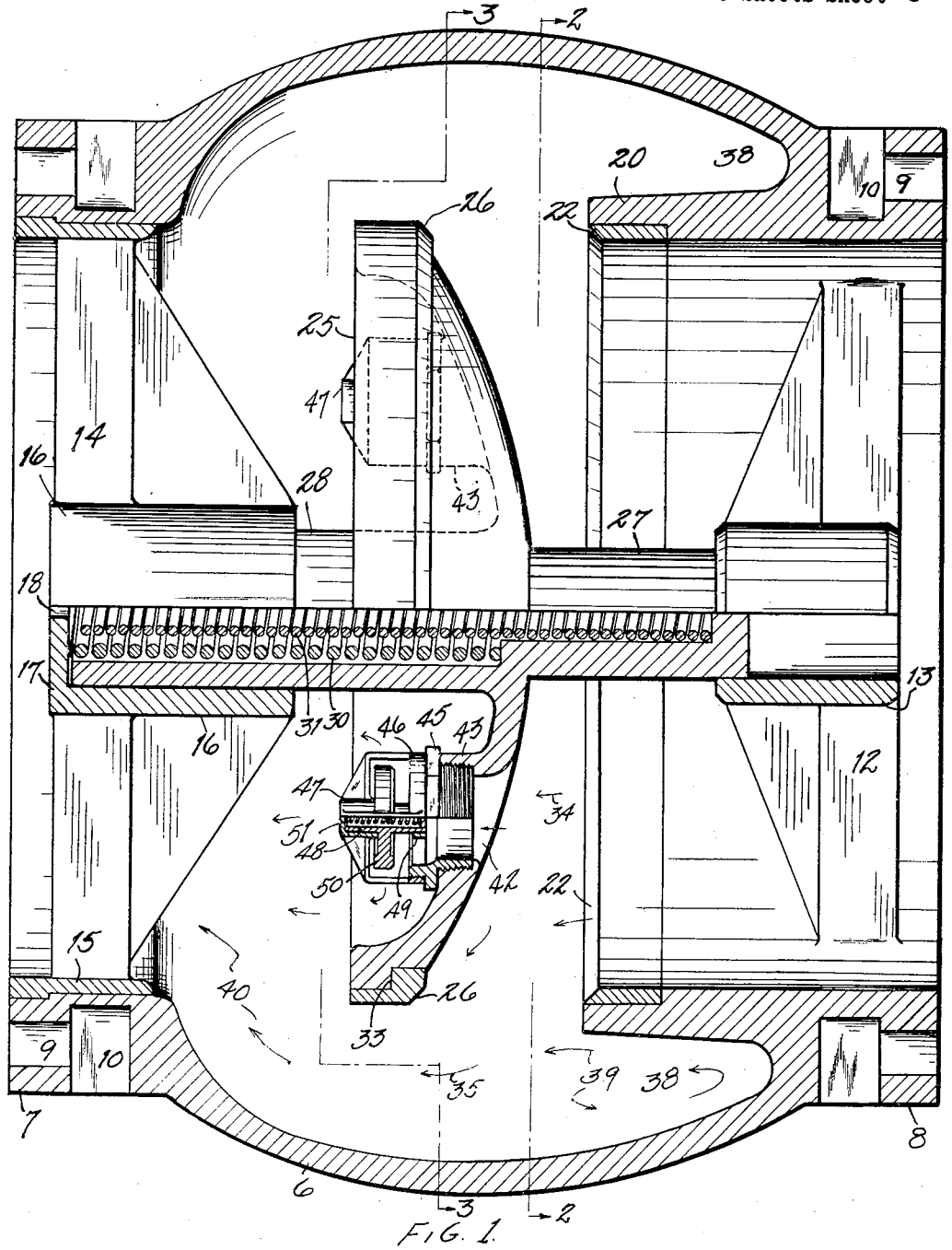
Fig. 1 is an axial sectional view through a valve made in accordance with my invention showing some of the parts in elevation.
Figure 3:
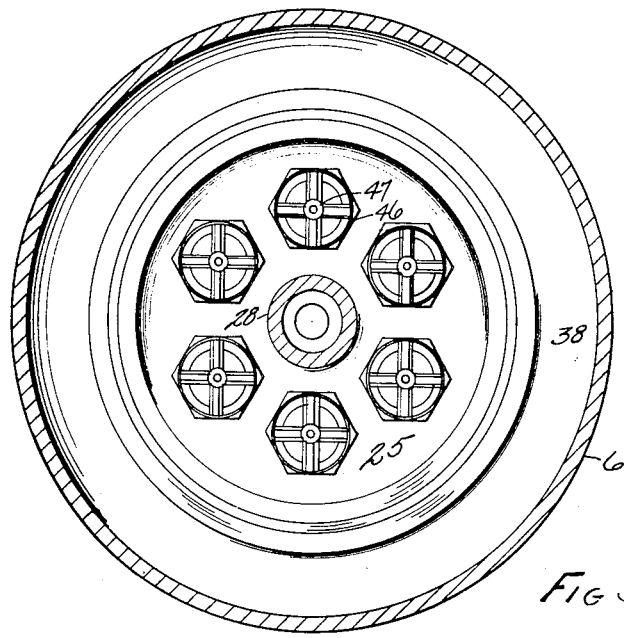
Fig. 3 is a similar section on a plane indicated by the line 3—3 of Fig. 1 and showing the auxiliary valves on the main valve disk.
Figure 2:
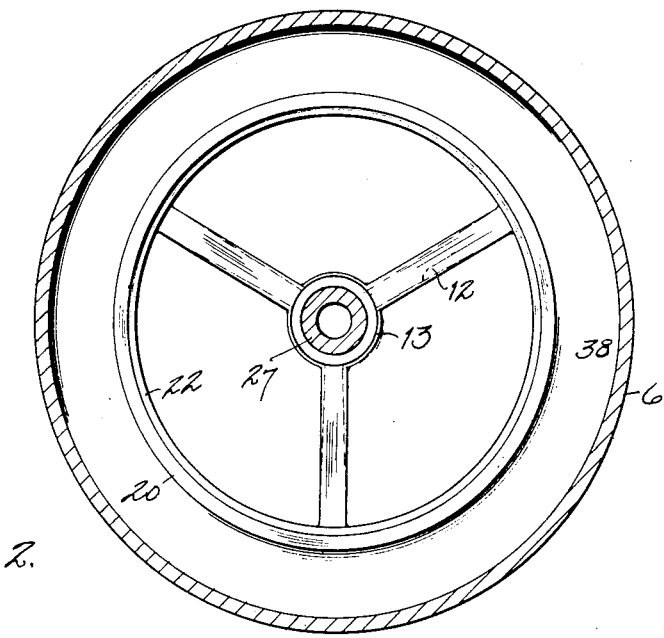
Fig. 2 is a transverse section substantially on a plane indicated by the line 2—2 of Fig. 1 and on a reduced scale.

The valve body is adapted to be secured between connected ends of the pipe, preferably by means of thickened annular portions 7 and 8, shown as formed integral on a partially globular shaped body 6. Securing means may comprise suitable bolts extending through openings or holes 9 terminating in recesses 10, the bolts connecting through flanges carried on the adjacent pipe ends. The valve body is materially, but not unnecessarily larger in diameter than the pipes, and within the annular portions 7 and 8 is provided with spiders. At one end the spider, as indicated, may consist of radial ribs 12 which are rigid with or cast with the valve body, and which join with and support a central tubular bearing portion 13. At the opposite end is a spider shown as having its legs 14 formed integral with a ring 15, and fitted into suitable offset bore in the annular portion 7 of the valve body, and as terminating in a bearing portion 16, having an end wall 17 with an opening 18 therein.

The valve seat is shown as formed upon an inwardly projecting crown or skirt 20, preferably integral with the valve body, and as provided with a valve seat ring 22 fitted into a suitable enlargement of the central bore thereof.

The main valve disk is designated 25 and is preferably formed somewhat bell shaped or in the nature of a spherical segment, the convex portion being turned toward the crown 20 and the valve seat 22. The valve disk may be formed integral with small hollow stems which act as guide posts, the smaller one toward the crown, designated 27, slidably extending into the bore of the guide 13, and the larger guide post 28 slidably fitting into the bore of the guide 16 of the opposite spider.

Concentric springs 30 and 31 extend through axial bores of these guide posts and react against the end wall 17 of the guide post 16, normally urging the valve disk 25 toward the seat 22. The valve disk may be provided with a ring of special metal for its seating surface 26, which cooperates with the complementary seat 22 of the crown 20.

A convenient method of securing the seating ring 26 in place is by providing the ring with internal bores of different diameters so as to form an annular seating shoulder 33 on the ring, which may seat on a cooperating annular shoulder on the valve disk.

The valve shown in substantially its full open position in Fig. 1 obviously will permit water to pass along the crown surface and around the disk, as indicated by the arrows 34—35. The radial flow of the water, especially where the flow is very rapid, tends to create a strong whirlpool or eddy current effect opposite the opening formed between the valve seat and crown of the disk, and I find that by allowing considerable space for this whirlpool or eddy effect the main flow of the stream is less seriously impaired.

It will be noted that inside of the annular pocket or trough 38, formed between the wall of the body 6 and the skirt 20, the water may flow in a direction substantially as indicated by the arrows 39. As it comes out past the inner edge of the skirt it tends to unite with the general flow of the stream passing the periphery of the disk rather than to cause an eddy or stir with a forcible backflow in the main stream.

It will be seen that the shape of the inner wall of the body 6 is such that the main stream is converged by a gradual or at least easy curves toward the discharge opening at the left, as indicated by the arrows 40, but there is a strong tendency for this stream to impinge with considerable violence at the center both upon itself and upon the guide bearing 16. By providing auxiliary valves in the main valve disk I may materially reduce the friction and eddy losses in such a valve. To this end I may use an arrangement such as here shown, in which openings 42 are formed in the crown of the valve disk through inwardly projecting bosses 43. These bosses are threaded to receive threads of auxiliary valve body members 45. As shown, these members 45 are also threaded to receive a threaded ring 46 of a spiderlike casing carrying a guide member 47, in which is slidably mounted a hollow guide post 48 of the auxiliary valve disk 50. A corresponding spider in the member 45 carries a guide member 49 in which is slidably mounted the oppositely extending hollow guide post of the auxiliary valve disk 50. The valve disk 50 is normally seated by a spring 51, and moved to its open position shown in Fig. 1 by the flow of the liquid. The number and size of such valves may be varied to suit varying conditions, such as different pressure heads, speeds of flow, different sizes of valve disks, etc., but very satisfactory results are obtained, for example, in a 20 inch valve of the type above described, by using 4 to 6 auxiliary valves, each having 2½ or 3 inch openings.

As the water or other liquid passes through the valve as heretofore described, a considerable portion of the stream instead of being deflected by the crown of the disk 25 obviously will pass through the auxiliary valves. This greatly reduces the large eddy or whirlpool effect beneath the crown or main disk and tends to straighten out the inward flow of the water at the low pressure side of the main valve disk. The auxiliary valves, of course, operate concurrently with the operation of the main disk; that is, they operate to pass fluid through the main disk while the main disk is open and fluid is passing around the rim thereof. In order to obtain this effect it is preferable that the auxiliary disks open at a unit pressure substantially equal to the unit pressure at which the main valve disk opens. However, the auxiliary valves will operate effectively when opening at unit pressures slightly higher or lower than the unit pressure required for the main disk, as the initial impact of the fluid entering the valve produces a pressure sufficiently in excess of the resisting pressure of the main and auxiliary valves so that it will cause them to open even though the unit seating pressure is slightly different. Various other effects take place within the valve but results have demonstrated a very substantial decrease of the losses especially noticeable under high pressures and rapid flow of the liquid.

Figure 4:
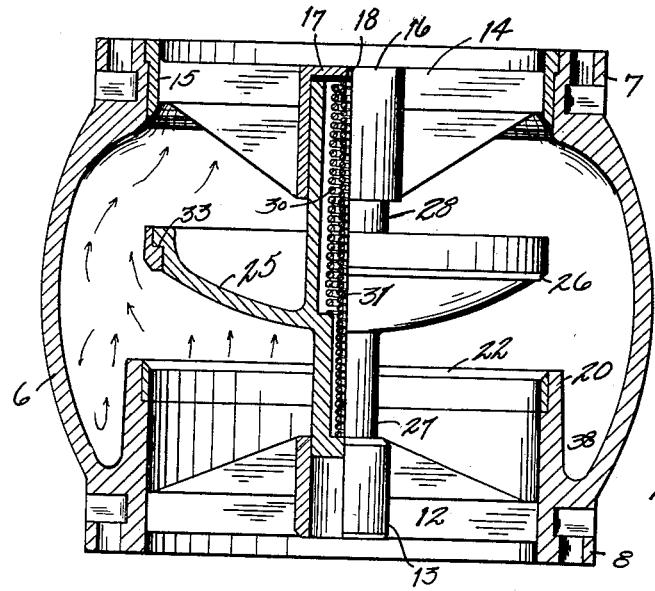
Fig. 4 is a section similar to Fig. 1 showing the embodiment of the valve without the use of auxiliary check valves.

The arrangement of the crown or spherical surface toward the flow of the stream with the corresponding arrangement of the inwardly projecting skirt carrying the valve seat, as described, provides a noticeable improvement in check valves, even without the use of auxiliary valves. Such an arrangement is shown in Fig. 4, in which the reference numerals designate parts corresponding to those heretofore described. It will be noted from the arrows in this figure, that the unimpeded flow is substantially the same as the eddy around the valve seat skirt. This modified form finds considerable utility particularly in smaller valves.

Figure 5:
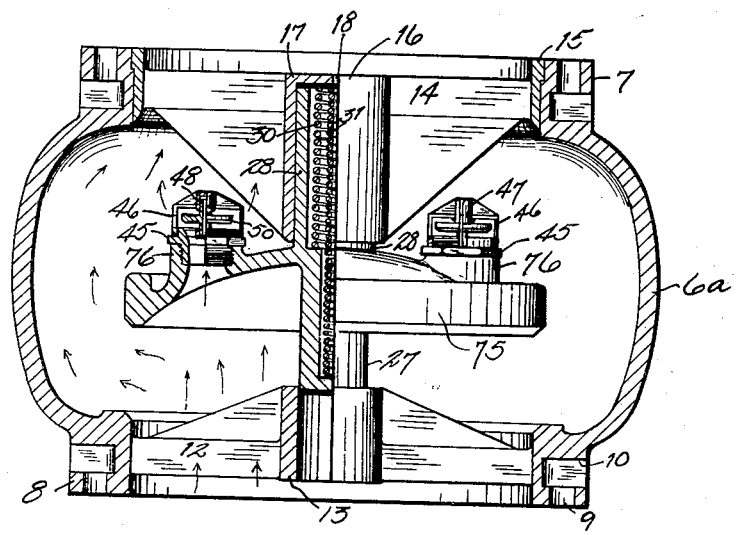
Fig. 5 is a similar section showing the arrangement of auxiliary valves upon a check valve of the form more nearly like that heretofore used, such as shown in my previous patents, for example, No. 1,662,896, granted March 20, 1928.

The modified form shown in Fig. 5, as indicated, comprises an arrangement of the main valve disk and seat similar to that shown in my prior patent above referred to, with the addition of auxiliary valves. In this arrangement the valve casing 6a is somewhat shorter in proportion to its length and joins with the annular portions 7 and 8, as heretofore described. As shown, the flow through this valve would be upwardly in Fig. 5. The valve disk is guided by the guide posts 27 and 28 slidable in the guide bearings 13 and 16 respectively, carried, as before described, on a spider having three or four supporting legs or ribs, as desired.

The main valve disk is here designated 75 and is shown as crowned or formed somewhat in the nature of a hollow sphere concave downwardly. This, by the way, is a very customary practice on the theory that the valve disk may be lighter and yet be very strong in its resistance to back pressure when closed, due to its arched effect. The flow into the concave side of the valve disk causes a very material backwash and considerable resistance to the stream. This may be greatly relieved by the use of the auxiliary valves mounted in bosses 76 into which the valve body members 45 of the auxiliary valves are threaded as heretofore described.

It will be noted that in each of the forms described, the auxiliary valves open in the same direction with respect to the flow as do the main valves. It is obvious that they may withstand the same pressure as the larger valve disk, yet are capable of simple construction and economic manufacture. If desired, auxiliary valves embodying the principle of the valve illustrated in Fig. 4 may be used.

I claim:

1. A check valve comprising a hollow body having coaxial entrance and exit passages at the ends and a closure disk in said body movable toward and away from said entrance passage and closing the same in one position of said disk, said disk having auxiliary passages therethrough, auxiliary valves on said disk for opening and closing said auxiliary passages for directing part of the fluids flowing through said valve through the valve disk, said auxiliary valves opening in the same direction as said disk and discharging directly toward the outlet passage, means associated with said disk and means associated with the auxiliary valves respectively for rendering said disk and auxiliary valves concurrently operable whereby a more direct flow of fluid through said check valve is obtained.

2. A check valve comprising a body having a globular chamber therein and axially aligned entrance and exit passages into said chamber, a closure disk in said chamber, a crown about said entrance passage extending into said chamber and forming with the walls thereof a deep annular trough, a valve seat upon said crown for seating said closure disk, said closure disk having auxiliary passages therethrough parallel to the axis of said entrance and exit passages, auxiliary valves on said closure disk for opening and closing said auxiliary passages, said auxiliary valves opening in the same direction and substantially concurrently with the closure disk.

3. A check valve comprising a hollow body having entrance and exit passages, an annular crown about the entrance passage forming with the body walls a deep annular trough, a closure disk within said body, a seat for said disk on said crown, a complementary seat on said disk said disk being convex on the side adjacent to said seat and having auxiliary passages therethrough and auxiliary valves on said closure disk for opening and closing the passages therethrough, said auxiliary valves being operable for opening in the direction as and concurrently with said closure disk, whereby water passing through the valve body is redirected by the trough and directed by the auxiliary valve for reducing backwash.

4. A check valve comprising a hollow valve body having entrance and exit passages, a closure disk within said body, a seat about the entrance passage for said disk, a complementary seat on said disk, means to support said disk in alignment with said seat for axial movement thereof toward and away from said seat, means to reduce surging of fluid passing through said body, said means including auxiliary valves on said disk operable by pressure on said fluid to introduce fluid through said disk to the side thereof opposite the entrance passage concurrently with the passage of fluid around said disk.

5. A check valve comprising a hollow valve body, a main closure disk within said body, a seat for said disk, a complementary seat on said disk, means to support said disk in alignment with said seat and to permit axial movement thereof toward and away from said seat, auxiliary passages through said main closure disk, a plurality of auxiliary valves on said main closure disk having auxiliary closure disks opening in the same direction as said main closure disk and aligned with said auxiliary passages, and individual resilient means urging said auxiliary disks respectively into closing position with unit pressure substantially equal to the unit pressure on the main closure disk.

6. A check valve comprising a hollow valve body having an entrance and an exit passage, a main closure disk within said body, a seat for said disk about said entrance passage, a complementary seat on said disk, means to support said disk in alignment with said seat and permit axial movement thereof toward and away from said seat for opening and closing the entrance passage, backwash reducing means comprising auxiliary passages through said valve disk, a plurality of auxiliary valves on said valve disk adapted to open in the same direction as said main closure disk and aligned with said auxiliary passages for passing fluid through said disk concurrently with the passage of fluid around the rim of said disk, said main valve disk being concave toward said seat and said auxiliary valves being evenly spaced about said main closure disk.

7. A check valve comprising a hollow valve body having an entrance passage and an exit passage, a closure disk within said body, a seat for said disk about said entrance passage, a complementary seat on said disk, means to support said disk in alignment with said seat for axial movement thereof toward and away from said seat for opening and closing the entrance passage, an auxiliary passage through said closure disk, an auxiliary valve on said closure disk opening in the same direction as said closure disk and aligned with said auxiliary passage and operable concurrently with said closure disk consequent upon the action of fluid flowing into the valve body.

8. A check valve comprising a hollow body member having aligned openings therein, a valve disk within said body member, guide posts on said valve disk extending in opposite directions therefrom, complementary sleeve members for each of said guide posts, means to support said sleeve members from said body member, an annular seating area in said body member about one of said openings, a complementary seating area on said valve disk, resilient means to normally seat said disk, auxiliary valves mounted on said disk and having passages through said disk, auxiliary closure disks within said auxiliary valves seating in the same direction as said valve main disk, and springs urging each of said auxiliary disks into seating position with substantially the same unit pressure as the said main valve disk.

9. A check valve comprising a hollow body having an inlet passage and an outlet passage, a valve seat formed at the inlet passage, and a closure disk movably mounted in the body coaxial with the inlet passage and cooperating with the seat, there being a backwash preventing auxiliary check valve device carried on said disk and opening in the same direction as said disk to by-pass fluid more directly therethrough in addition to and concurrently with the passage thereof about the rim of the disk.

10. A check valve comprising a hollow body having axially aligned inlet and outlet passages, a valve seat formed at the inlet passage, a closure disk movably mounted within the body and adapted to close said seat, said disk being convex toward said inlet passage, and means comprising an auxiliary check valve arranged on said disk and closing toward the convex surface thereof to effect direct passage of fluid therethrough and to reduce backwash on the outlet side of the disk concurrently with the passage of fluid about the rim of the disk.

11. A check valve comprising a hollow body having inlet and outlet passages, a valve seat formed at the inlet passage and a closure disk having a globular surface, said disk being movably mounted in the body coaxially with the inlet passage and cooperating with the seat and presenting the globular surface to said inlet passage, there being an auxiliary check valve device carried on said disk and opening in the same direction as said disk to pass fluid therethrough during the passage of fluid about the rim of the disk, said auxiliary valve device closing toward said globular surface.

12. A check valve comprising a hollow body having an inlet passage and an outlet passage, a valve seat formed at the inlet passage, a closure member movably mounted to engage said seat, said closure member having auxiliary check valve means thereon arranged to allow by-passage of fluid through the closure member while the latter operates to pass fluid through the valve body around the periphery of the closure member and adapted to distribute the by-passed fluid equally about the axis of the closure member in a plurality of radial planes to uniformly reduce backwash on the outlet side of said member.

MICHAEL SMOLENSKY.